United States Patent [19]

Reesman et al.

[11] 3,996,384

[45] Dec. 7, 1976

[54] CEREAL FLAKES PRODUCT AND PROCESS

[75] Inventors: Stanley H. Reesman; Norman F. Lawrence, both of Battle Creek, Mich.

[73] Assignee: General Foods Corporation, White Plains, N.Y.

[22] Filed: May 28, 1975

[21] Appl. No.: 581,469

[52] U.S. Cl. .................................. 426/96; 426/457; 426/458; 426/621

[51] Int. Cl.$^2$ ...................... A23L 1/10; A23L 1/164

[58] Field of Search .......... 426/450, 621, 457, 620, 426/458, 619, 508, 622, 509, 625, 466, 618, 96, 302

[56] References Cited

UNITED STATES PATENTS 2,928,743  3/1960  Rutgers ............................ 426/457

OTHER PUBLICATIONS

Matz; "Cereals as Food and Feed" Avi Pub. Co. Inc., Westport Conn. 1959.
Chem. Abstracts; Ahmed et al., 1974; vol. 82, 71755d, "Amino Acid Comp. Protein Fractions and Baking Quality of Triticale".

*Primary Examiner*—S. Leon Bashore
*Assistant Examiner*—Kenneth M. Schor
*Attorney, Agent, or Firm*—Bruno P. Struzzi; Thomas V. Sullivan; Michael J. Quillinan

[57] ABSTRACT

Triticale is soaked at an elevated temperature, drained, tempered and then bumped preparatory to being cooked with added syrup, partially dried, flaked and toasted to produce a curled, crinkly, crisp breakfast cereal.

8 Claims, No Drawings

CEREAL FLAKES PRODUCT AND PROCESS

INTRODUCTION

This invention relates to a process of producing a uniquely flavored, novel, flaked, ready-to-eat breakfast cereal product from triticale and the product of that process.

BACKGROUND OF THE INVENTION

Triticale is a cross breed between wheat and rye grains having a higher protein content than either or wheat or rye separately. The grain has a unique flavor and offers the potential of supplanting existing cereal grains in the dry, ready-to-eat category of breakfast food products.

It is an object of this invention to provide a process whereby triticale can be converted into an acceptable, high protein cereal flake having desirable crispness retention in milk and an acceptable, novel flavor, it being understood that the expression "high protein" applies to the relative percent of protein in the grain per se in relationship to rye and wheat; other fortifying cereal supplements in the form of leguminous or cereal proteins, isolates, concentrates or meals generally may be employed in combination with the triticale to increase protein content.

STATEMENT OF THE INVENTION

In accordance with the present invention, triticale is steeped in water until it has absorbed a substantial amount thereof typically ranging above 30%, drained, tempered for a period of time to afford equilibration and then bumped in a suitable flaking or corrugated roll operative to compress the grain to the extent that it does not lose its structural integrity per se, but is flattened in order to open the grain by cracking the husk portion thereof and permitting access of water thereto. Subsequently, the grain is coated and infused with a sweetening agent as by the spray application of a syrup onto the bumped grain or by immersion of the bumped grain in a syrup solution whereupon the bumped grain is cooked to substantially gelatinize the starch content thereof to an edible consistency when the grain is eaten as such, as a result of which cooking the grain will be hydrated to a moisture content substantially in excess of 55%. The grain may be cooked in a rotary immersion cooker or in a steam pressure vessel, preferably the latter, for that length of time required to effect the intended gelatinization. Thereafter, the cooked grains are cooled and dried in an air dryer preparatory to flaking and toasting the bumped, cooked grains; after such partial dehydration the grains are tempered for one hour or that period whereat remaining moisture is equilibrated whereupon the grains are flaked by passing through bumping rolls having a gap setting less than 0.030 inch. The flaked grains are eventually toasted at a caramelizing temperature into a curled, crinkly, crisp texture. For flavor purposes, the flaked product may be coated with a sweetening agent such as sucrose or sucrose with invert in accordance with known art procedures.

| BEST MODE Formula & Process | | |
|---|---|---|
| Triticale Grain | 86% | dry basis |
| Sugar | 10 | " |
| Salt | 3 | " |
| Malt Syrup | 1 | " |
| Water | | |

Triticale was steeped in 145° F water for 1 hour to 40% moisture, drained, tempered for 1½ hours and then passed into the nip between corrugating rolls operative to bump or flatten the grain to about 1/32 inch thickness. Thereafter, syrup prepared from the non-grain ingredients was applied to the bumped grain in a coating reel and it was cooked in a pressure vessel at 15 psig for 25 minutes. The cooked grain was then cooled for 15 minutes on a cooling screen and partially dried in a gas-fired Proctor and Schwartz tray dryer to about 15% moisture using a drying inlet air temperature of 250° F dry bulb for 5 minutes to reduce the moisture content thereof. The partially dried "grits" of triticale were then sized by passage through 5/16 inch screens and prepared for a final flaking by heating the grits in the aforesaid Proctor and Schwartz tray dryer using an inlet drying air temperature of 280° F with forced air for 45 seconds whereupon the triticale grits were cooled with forced room temperature air whereby they are preferably case-hardened. The case-hardening causes the plasticized heated grits to be flaked with a irregular scalloped appearance. The grits are flaked by passage through rolls set at a gap setting of about 0.020 inches and are then toasted by introduction to the aforesaid tray dryer using a drying inlet air temperature of 280° F for 4 minutes. The resultant product was curled and crinkly and had a crisp texture. When coated with a syrup at 10–15% level it provided a flavorful, agreeable taste.

By pre-soaking the triticale grain, it may be bumped uniformly and substantially to permit flavoring syrup to not only coat the grain, but also penetrate it and provide an intended flavoring therefor. This permits subsequent cooking of the grain in a single step or in any event if a multiplicity of steps are employed in a shortened cooking period whereby overcooking and sloughing of solids is minimized. Preferably to minimize the solids loss and provide desired texture, the grain will be pressure-cooked, that is, charged to a pressure vessel to which steam is injected and wherein the added water of the steam and the water present in the grain is operative to effect the intended gelatinization to a tender texture to suit taste. It will be understood by those skilled in the art that although the preferred procedure calls for cooling the heated triticale grits to below 130° F preparatory to flaking, it is not a necessary aspect of the invention since the heated, bumped grits that have been dried, for example to a moisture content generally below 20% and typically between 12–18%, may be flaked readily. However, cooling after such heating to plasticize the grain preparatory to flaking provides distinctive textural characteristics in the ultimate piece that is toasted. Thus, the cooling case-hardens the plasticized grits to provide the intended versatility of texture therein.

In practicing this invention, care should be exercised to avoid development of a harsh, disagreeable flavor by employing either a prolonged roasting time or elevated temperature. Unfortunately, when elevating the triticale much above the caramelization temperatures of 375° F, such a disagreeable flavor can be generated, particularly with protracted drying and toasting to moisture contents below 5%, for example in the range of 1–3% which is the stable moisture content intended for the toasted flakes of this invention. The inclusion of a syrup in the bumped grain is believed to promote the development of the conventional brown color but for which a more prolonged period would be required in toasting with an accompanying harsh, disagreeable flavor.

Thus, the sequence of steps practiced and outlined hereinabove are all interrelated to one another in order to provide a flavorful ready-to-eat breakfast cereal texture through the desired presence of a flavoring syrup coating and infusing the triticale grain preparatory to cooking. In this connection, the term "syrup" is intended to apply to the conventional malt syrups, sucrose syrups, syrups high in invert and the like such as will occur to skilled art workers.

What is claimed is:

1. Process for making a toasted triticale ready-to-eat flake comprising soaking triticale grain in an aqueous solution to increase its moisture content, bumping the soaked grain to flatten and compress the grain to the extent it does not lose its structural integrity per se but is flattened to open the grain by cracking the husk portion thereof, cooking the bumped grain to gelatinize the starch content thereof and increase its moisture content to 55%, partially drying the cooked grain to less than 20% moisture, flaking the partially dried grain and toasting it.

2. Process of claim 1 wherein the cooked grain is coated and infused by a sweetening syrup.

3. Process of claim 2 wherein the grain is partially dried to 12–18% moisture before flaking.

4. Process of claim 3 wherein the grain is cooled to below 130° F before flaking and after drying.

5. Process of claim 4 wherein the grain is case-hardened before flaking and after drying.

6. Process of claim 2 wherein the flaked grain is toasted to an intended brown color at a temperature below 375° F.

7. Product of the process of claim 1.

8. Product of the process of claim 6.

* * * * *